United States Patent [19]
Koganezawa et al.

[11] Patent Number: 5,951,921
[45] Date of Patent: Sep. 14, 1999

[54] APPARATUS FOR PRODUCING OZONE WATER

[75] Inventors: Akihisa Koganezawa; Yukio Akahori, both of Shizuoka, Japan

[73] Assignee: Core Corporation, Shimizu, Japan

[21] Appl. No.: 08/968,518

[22] Filed: Nov. 12, 1997

[30]     Foreign Application Priority Data

Jan. 31, 1997 [JP] Japan ........................................ 9-32895
Jan. 31, 1997 [JP] Japan ........................................ 9-32896

[51] Int. Cl.⁶ ........................................................ B01F 3/04
[52] U.S. Cl. ............................ 261/36.1; 261/76; 261/151; 261/DIG. 42; 261/DIG. 75
[58] Field of Search ........................... 261/76, 36.1, 151, 261/29, DIG. 42, DIG. 75

[56]              References Cited

U.S. PATENT DOCUMENTS

| | | | |
|---|---|---|---|
| 2,388,753 | 11/1945 | Mallmann et al. | 261/DIG. 42 |
| 2,970,821 | 5/1961 | Axt | 261/DIG. 42 |
| 3,775,314 | 11/1973 | Beitzel et al. | 261/DIG. 42 |
| 4,049,552 | 9/1977 | Arff | 261/DIG. 75 |
| 4,207,180 | 6/1980 | Chang | 261/151 X |
| 4,483,826 | 11/1984 | Louthan | 261/36.1 X |
| 4,597,877 | 7/1986 | Gaia | 261/DIG. 75 |
| 4,640,786 | 2/1987 | Kern | 261/DIG. 75 |
| 4,701,194 | 10/1987 | Weyers et al. | 261/76 X |
| 5,431,861 | 7/1995 | Nagahiro et al. | 261/36.1 X |

FOREIGN PATENT DOCUMENTS 2298702  8/1976   France ........................... 261/DIG. 42

*Primary Examiner*—Richard L. Chiesa
*Attorney, Agent, or Firm*—Wenderoth, Lind & Ponack, L.L.P.

[57]              ABSTRACT

An apparatus for producing ozone water by accelerated mixing and dissolving of ozone into water due to an enhanced contact efficiency of ozone gas and water with controlled temperature includes a circulation line for circulating ozone water and employs a jet nozzle (4) in a conduit (4) which returns the ozone water from the circulation line into a primary container. This causes negative pressure about the outlet of the nozzle, whereby the ozone gas is sucked into the water which is jetted. Thus, the ozone gas is rapidly mixed and dissolved into the water. Efficiency of stirring of the ozone water is also enhanced. A secondary container is provided in the circulation line, which specially facilitates cooling of the ozone water as well as prevention of freezing.

6 Claims, 9 Drawing Sheets

APPARATUS FOR PRODUCING OZONE WATER

BACKGROUND OF THE INVENTION

1. Field of the Invention

The present invention relates to an apparatus for producing water which contains dissolved ozone (hereinafter referred to as "ozone water").

In recent years, it has been known to utilize strong oxidation effects of ozone for the purpose of disinfection, or for the purpose of processing, cleaning or other treatments of industrial products. Advantages from these utilizations exists in that ozone has strong power for the above tasks and in that those steps for removing or safening of chemicals can be omitted or substantially reduced, as compared with the cases using other chemicals except ozone, because extra ozone or released ozone rapidly decomposes in itself under usual conditions. In particular, inventors of the present invention have been paying attention to an advantage that ozone can be applied in highly accurate total amount and at highly accurate concentration to a place to be treated, when ozone is delivered after the ozone is put into the form of ozone water, and have been working to improve technologies in the related fields thereof.

2. Description of the Related Art

It is known that ozone water can be obtained by mixing and dissolving ozone into water.

Further, it is known to mix and dissolve general gases into liquids by merely employing aspirators or by utilizing typical bubbling-type methods.

However, when ozone is simply mixed and dissolved into water by using the above known methods for mixing and dissolving gases into liquids, it is difficult to provide ozone water at a stable concentration. One reason for causing this difficulty is in that ozone is hardly water-soluble and the concentration of ozone in water tends to go down rapidly because the ozone in water rapidly decomposes. In particular, in order to produce and maintain ozone water at a preferred high concentration, it is necessary to obtain higher speed of mixing and dissolving than the speed of the decomposition. However, the speed of the decomposition increases as the ozone concentration increases. Therefore, it is necessary to increase the speed of mixing and dissolving in order to increase the maximum obtainable concentration of ozone in water. However, it has been difficult to increase the speed of mixing and dissolving to an extent satisfactory for the purpose of production of ozone water, if any of the above many known methods for mixing and dissolving gases into liquids is merely employed. This is one of big problems to be solved by the present invention.

Further, many of the known methods mixing and dissolving gases into liquids defect in that they cause decrease of pressure in the gas system or in that they cause resistance in the gas fluid lines. The inventors of the present invention considered that these defects not only give load by changes of the pressure to their apparatuses but also include other problems. If the above known methods are reviewed in the viewpoint for production of ozone water, it can be foreseen that the changes of the pressure tend to unstabilize the preferable condition of equilibrium in the concentration of solution and tend to badly effect the ozone gas supply means(for example, ozone generators). They are significant problems.

And we have not found any known technologies to solve all the above mentioned problems at the same time.

SUMMARY OF THE INVENTION

The purpose of the present invention is to present apparatuses for producing ozone water which can solve the above mentioned problems in order to produce ozone water in a quick manner and in order to maintain or provide ozone water at stable concentrations.

In order to achieve the above purpose, by the present invention provided is an apparatus for producing ozone water which substantially comprises a means for controlling temperature, a primary container for containing in-process ozone water and a circulation line which can communicate with the container. Preferably, the circulation line comprises a secondary container and the secondary container is equipped with the means for controlling temperature. Preferably, in the circulation line provided is a nozzle which causes negative pressure at the outlet of the nozzle so that ozone gas is drawn into and mixed and dissolved by the ozone water which is being circulated by the circulation line.

Illustratively, the apparatus for producing ozone water comprises a circulation line which circulates ozone water and the ozone water from the circulation line is returned by a conduit in which an ejector nozzle is used in order to cause negative pressure locally at the outlet of the nozzle. Thus the ozone gas is forcefully drawn into the water which is being ejected by the nozzle. The ozone gas is rapidly mixed and dissolved into the water, thereby enhancing a stirring effect on the ozone water in the primary container. A thin-shaped secondary container in contact with a metallic cooling medium means is provided in the circulation line so that the control to cool the ozone water is enhanced. By these configurations, unwanted freezing is also prevented. Further, these configurations minimize bad effects of the general vibrations and the changes of pressures. They provide more simplified mechanisms for mixing and stirring than those of conventional apparatuses, thereby presenting stability in operations and many advantages in maintenance.

BRIEF DESCRIPTION OF DRAWINGS

The present invention will be understood more fully from the detailed description given hereinafter and from the accompanying drawings of the preferred embodiment of the present invention, which, however, should not be taken to be limitative to be present invention, but are for explanation and understanding only.

In the drawings.

DESCRIPTION OF PREFERRED EMBODIMENTS

The present invention will be discussed hereinafter in detail in terms of the preferred embodiments of the present invention with reference to the accompanying drawings. In the following description, various specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

As illustrated in FIGS. 1–14, an apparatus 99 of the present invention comprises a primary container 1 for containing both the liquid 60 and the gas 70 which includes ozone, a pump 3 for circulating the liquid 60 from the container 1 into a circulation line 2, an aspirator 4 or an ejector (not shown in the Figures) located in the circulation line 2 for mixing and dissolving ozone into the liquid 60 and a means for controlling temperature for controlling the temperature of the liquid 60 to a temperature at which the dissolution of ozone into the liquid 60 is facilitated. Portions of all these components which contact with ozone are made of materials such as anticorrosive ozone-proof resin. The liquid 60, when introduced into the apparatus 99 at first or as a raw material, may be water. Alternatively, ozone water at some reasonable concentration may be introduced as a material to be further treated or a material to be just reserved. As the operation of the apparatus 99 is continued, ozone concentration of the liquid in the apparatus 60 rapidly becomes higher and higher to reach a predetermined concentration due to the ozone mixed and dissolved from the gas 70 which includes ozone. Thus, the liquid 60 becomes well-controlled ozone water of the predetermined concentration, which can be utilized for various purposes. It should be understood that the "water" to be used in the apparatus 99 as a raw material for producing ozone water can mean not only pure water but also other kinds of waters, for example, tap water, brine, etc., which may contain impurities depending on costs and purposes.

Figure 1:
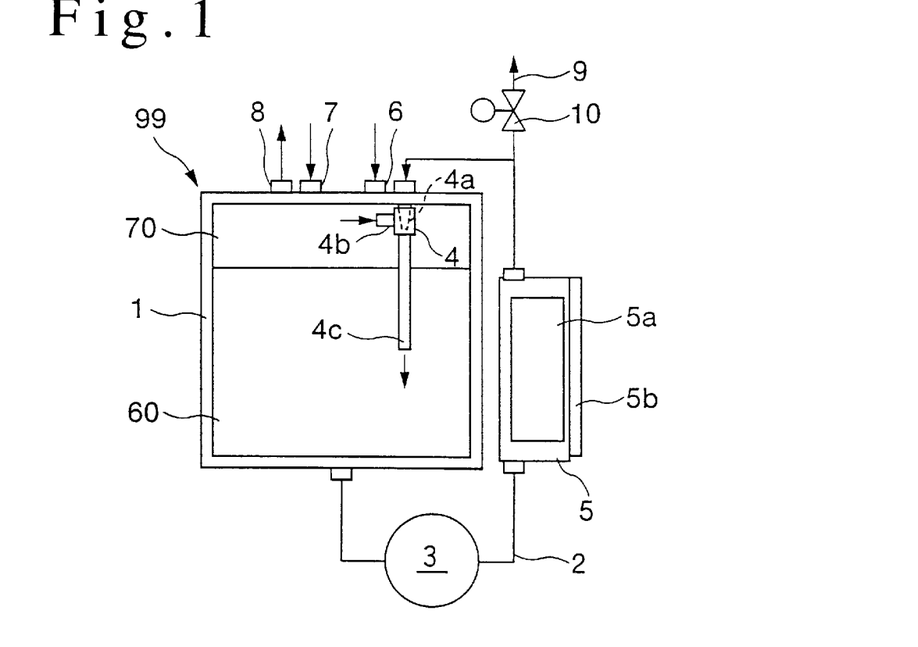
FIG. 1 is a schematic elevation partly in section of an embodiment of the apparatus according to the present invention.

The container 1 is further provided with an inlet opening 6 for the liquid 60, an inlet opening 7 for the gas including ozone, an exhaust orifice 8 for the exhaust gas and an outlet 9 for the produced ozone water. The outlet 9 is preferably located at the circulation line 2, although the outlet 9 can be located directly at the container 1. The outlet 9 is further provided with an open/close valve 10. Thus, a constant amount of ozone at a constant concentration is introduced from the inlet opening 7 so as to form and make up the gas 70. On the other hand, any extra amount of the gas 70 is exhausted from the exhaust orifice 8. Thus, in the container 1, increase of the total pressure of the interior gas is prevented while the ozone partial pressure is always maintained at a constant value. Further, if necessary, catalyst for decomposition of ozone is located at the exhaust orifice 8, thereby decomposing ozone into oxygen before release into the atmosphere.

The liquid 60 which is sent by the pump 3 and travels through the circulation line 2 is further jetted out of the nozzle 4a of an aspirator 4, which causes negative pressure at the outlet of the nozzle so as to suck the gas 70 into an suction portion 4b and further mix-dissolve it into the liquid 60. This course of action increases percentage content of ozone in the circulating liquid 60. Thus ozone-increased liquid 60 is spurted from a return 4c into the bulk liquid 60 in the container 1 so as to stir the latter liquid 60 in the container 1, which course of action also contributes to accelerate the mixing and dissolution of ozone. This operation can be repeated as needed, therefore, ozone water can be stably produced having as high concentration and as high uniformity as needed.

Figure 2:
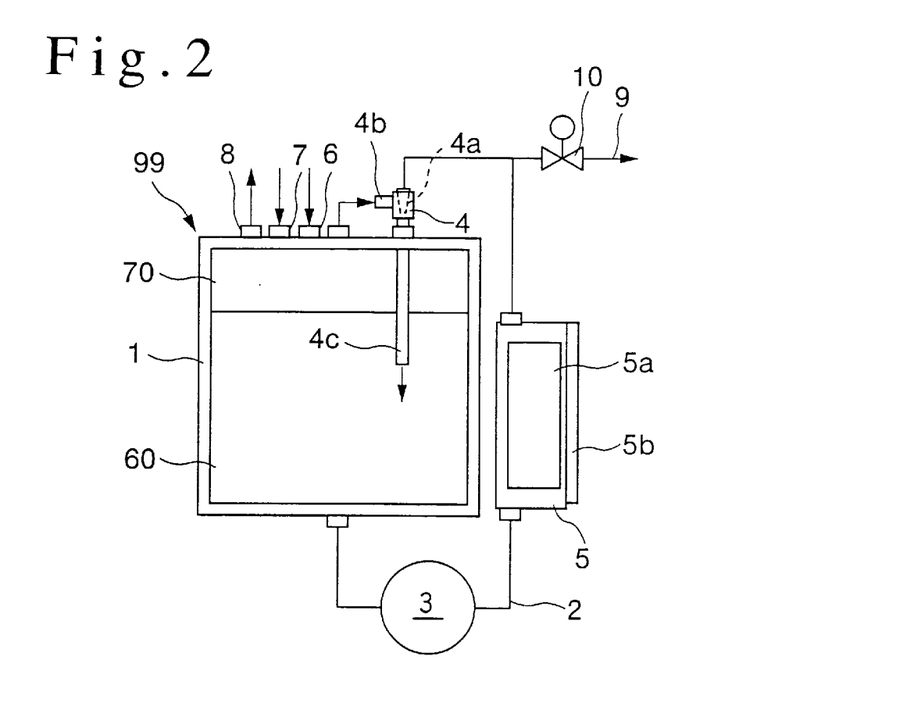
FIG. 2 is a schematic elevation partly in section of a modified embodiment of the apparatus of FIG. 1.
Figure 3:
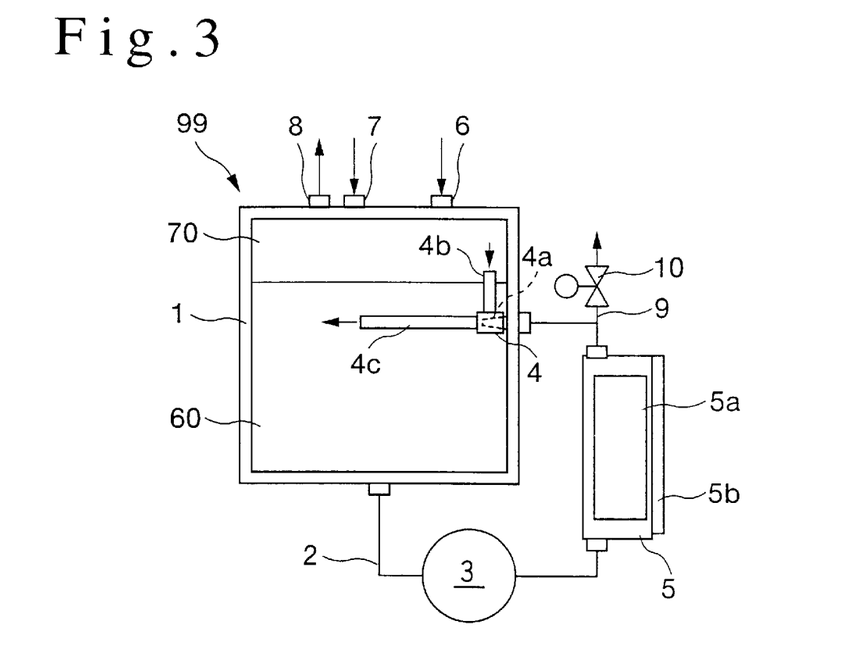
FIG. 3 is a schematic elevation partly in section of another modified embodiment of the apparatus of FIG. 1.
Figure 4:
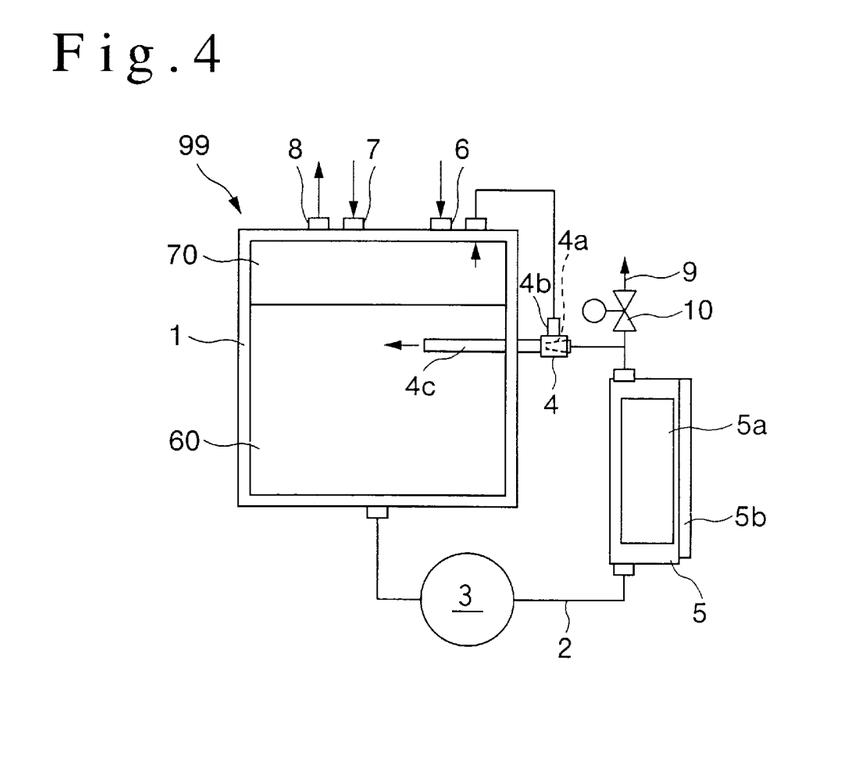
FIG. 4 is a schematic elevation partly in section of another modified embodiment of the apparatus of FIG. 1.
Figure 5:
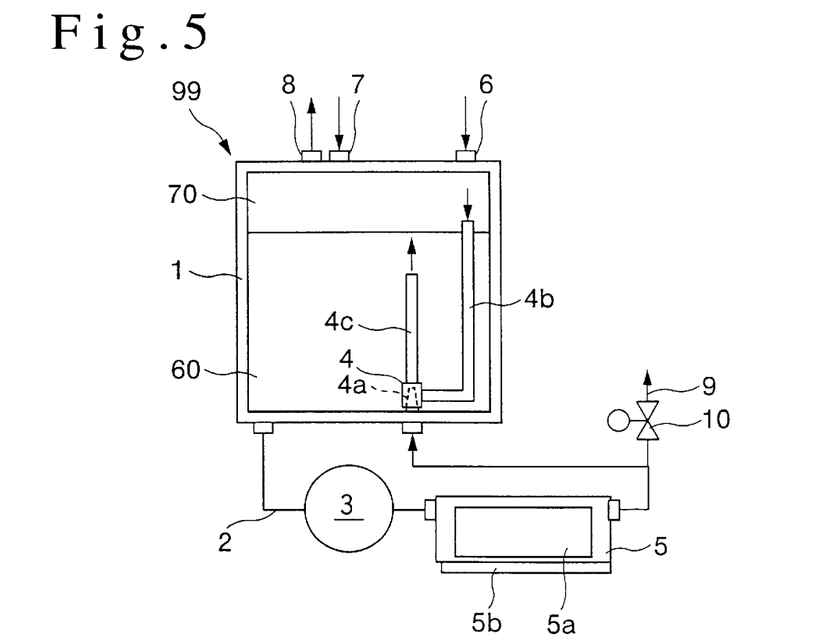
FIG. 5 is a schematic elevation partly in section of another modified embodiment of the apparatus of FIG. 1.
Figure 6:
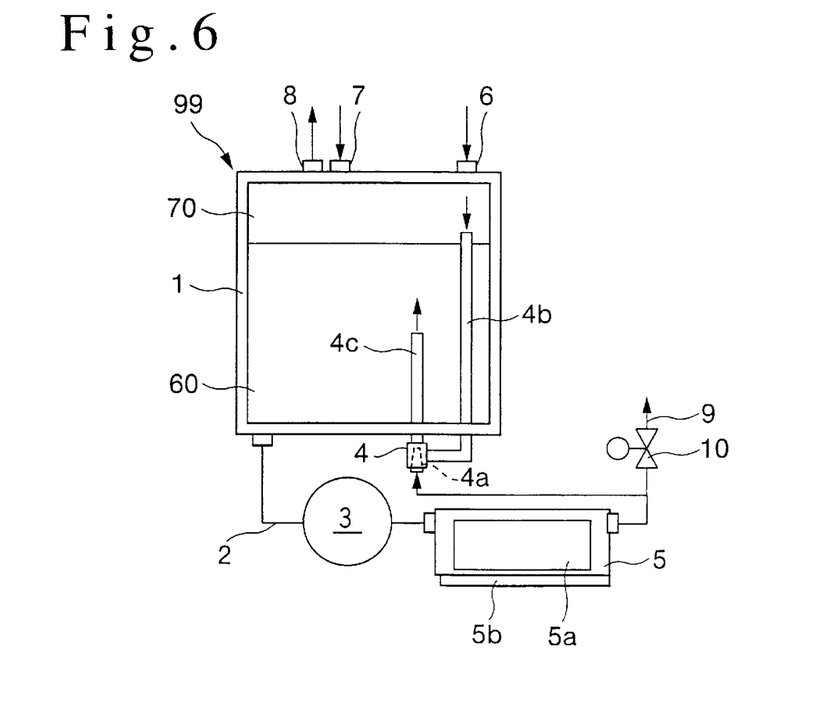
FIG. 6 is a schematic elevation partly in section of another modified embodiment of the apparatus of FIG. 1.
Figure 7:
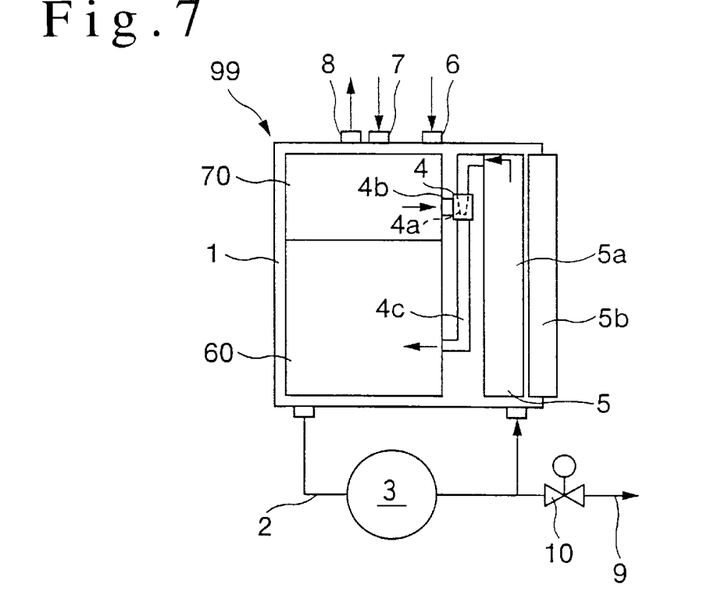
FIG. 7 is a schematic elevation partly in section of a further modified type of embodiment from the apparatus of FIG. 1 so as to comprise integrally the means for controlling temperature.
Figure 8:
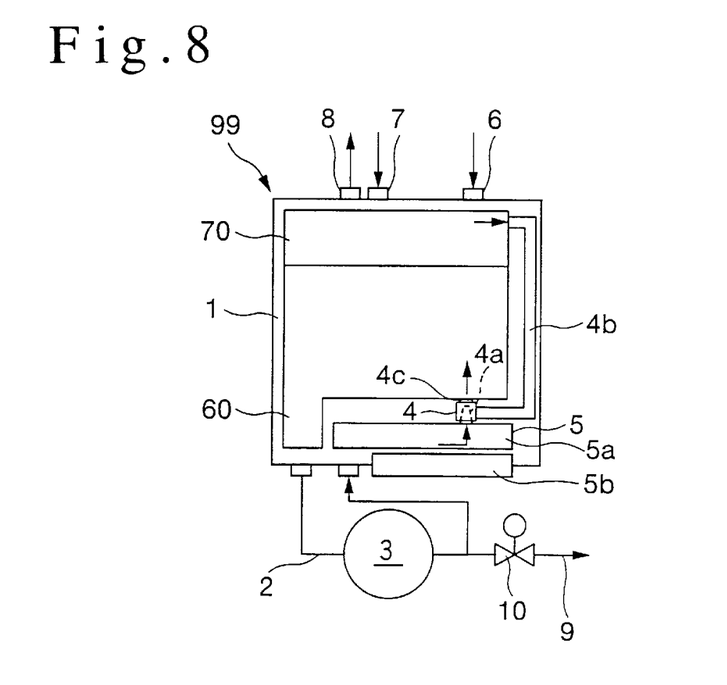
FIG. 8 is a schematic elevation partly in section of a modified embodiment of the apparatus of FIG. 7.

One example regarding the location of the aspirator 4, etc., is to locate the aspirator 4 in the gas in the container 1 and to open the suction portion 4b into the gas 70 and to open the return 4c which is inserted into the liquid 60 as shown in FIG. 1. The aspirator 4 may be located out above the container 1 and the return 4c can be inserted into the liquid 60 in the container 1 and the suction portion 4b can be made communicative with the gas 70 via a connection piping as shown in FIG. 2. The aspirator 4 can be located in the liquid 60 in the container 1 and the suction portion 4b can be directly opened into the gas 70 and the return 4c can be inserted in the liquid 60 as shown in FIG. 3. As illustrated in FIG. 4, the aspirator 4 can be located out of and at the side of the container 1 and a piping can be located to connect the suction orifice 4b in a communicative manner with the gas 70 and the return 4c can be inserted and opened into the liquid 60 in the container 1. As shown in FIG. 5, the aspirator can be located in the liquid 60 in the container and the suction portion 4b can be inserted into the gas 70 and the return 4c can be opened into the liquid 60. As shown in FIG. 6, the aspirator 4 can be located under the container 1 and the suction portion 4b can be inserted through the liquid 60 and opened into the gas 70 and the return 4c can be inserted and opened into the liquid in the container 1. As shown in FIG. 7, the aspirator 4 can be located between the container 1 and a means 5 for controlling temperature integrally provided thereto at the side and the suction portion 4b can be opened to the gas 70 in the container 1 and the return 4c can be opened to the liquid 60 in the container 1. Further preferably, the aspirator 4 can be located between the container 1 and the means 5 for controlling temperature integrally provided thereto on the underside and the return 4c can be located to be communicative with the liquid 60 at the lower portion of the container 1 as shown in FIG. 8. Many variations or changes aside from the above examples can be possible within the scope of the present invention.

When ozone is mixed and dissolved into the water, the lower the temperature is, the higher concentration is achieved. Further, the narrower the range of errors in the controlled temperature is, the more accurate the obtained concentration becomes. Therefore, it would be preferable to maintain the water at a constant temperature which is within the range of 0–15 degrees Celsius(centigrade), although the inventors have confirmed by their experiments that even the water of 30 degrees Celsius would be acceptable in the apparatuses of the present invention. As shown in FIGS. 1–8, the means 5 for controlling temperature of water for such purposes preferably utilizes a Peltier cooler which comprises a metal plate 5b of which temperature is controlled by one or more Peltier effect elements. The plate 5b is attached to a partial or entire portion of the wall of a thin cooling chamber 5a located in the circulation line 2. The cooler 5 can be made in a body separate from the container 1 as shown in FIGS. 1–6. It can be located under the container 1 as shown in FIGS. 5–6. As a modified example, the cooler 5 can be formed as an integral part of the container 1 aligned on its side or under it, etc., as shown in FIGS. 7–8, wherein the liquid 60 which flows through the cooling chamber 5a can be cooled by the metal plate 5b.

Figure 9:
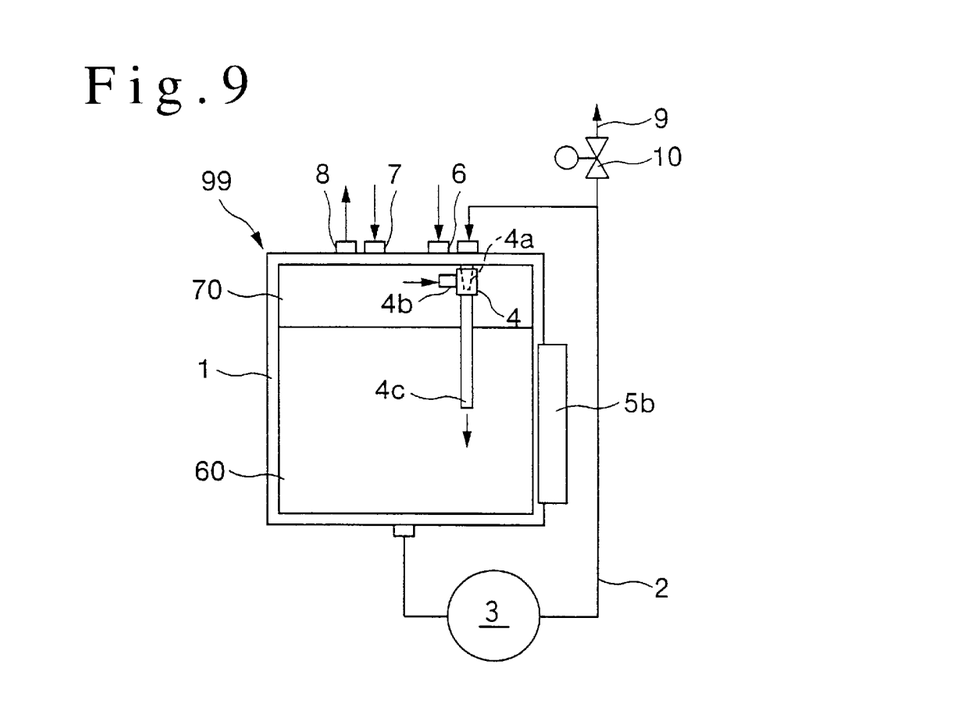
FIG. 9 is a schematic elevation partly in section of a further modified type of embodiment from the apparatus of FIG. 1 so that the primary container is directly provided with the means for controlling temperature.
Figure 10:
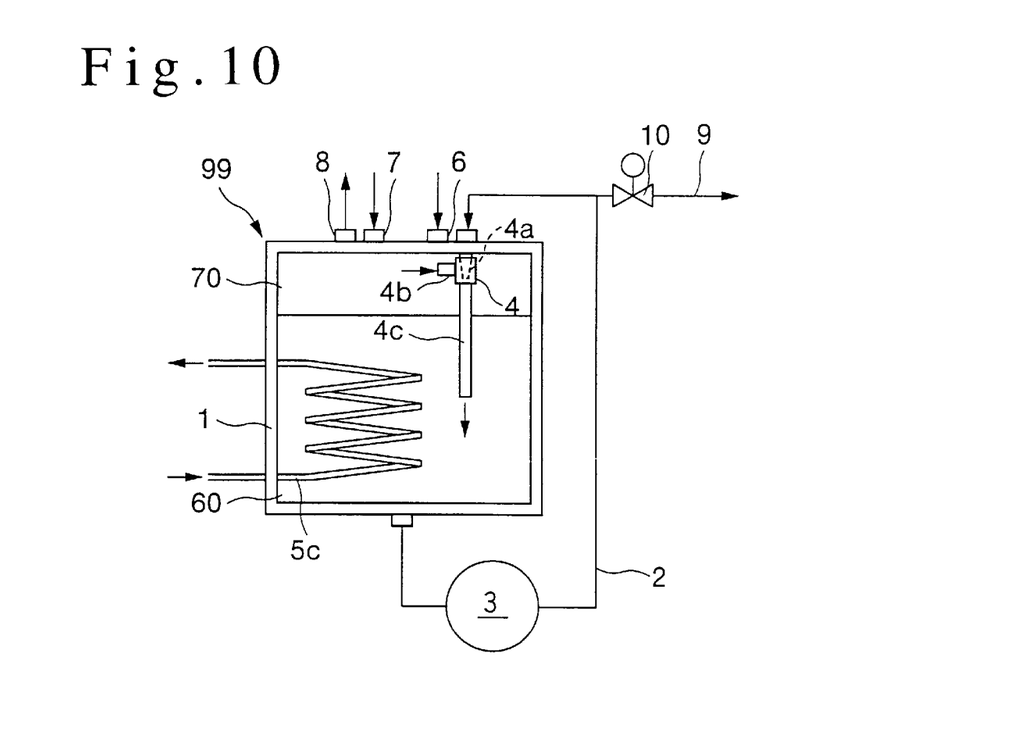
FIG. 10 is a schematic elevation partly in section of a modified embodiment of the apparatus of FIG. 9.
Figure 11:
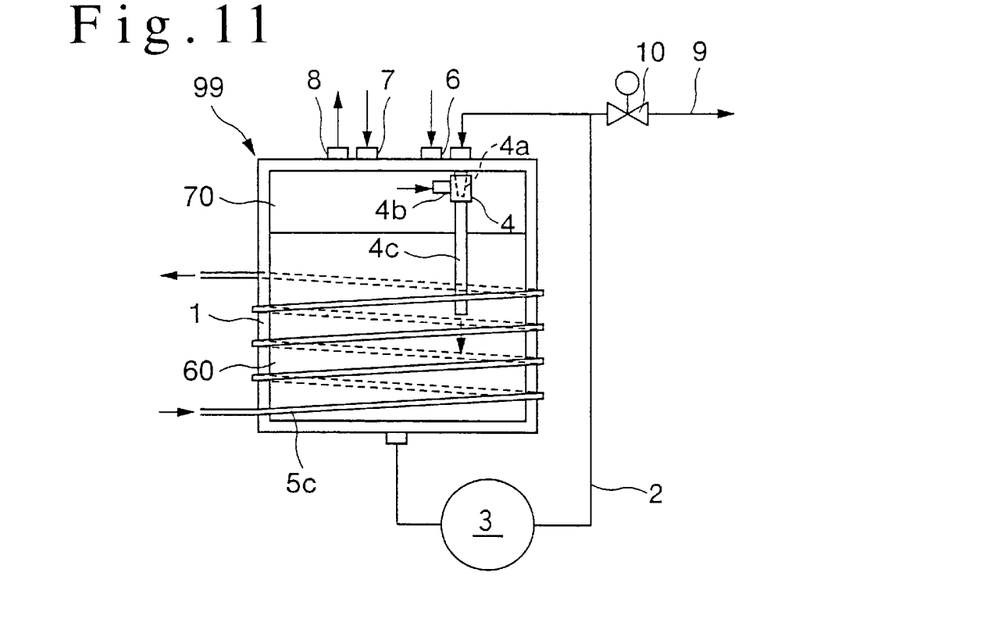
FIG. 11 is a schematic elevation partly in section of another modified embodiment of the apparatus of FIG. 9.

As an example wherein the means 5 for controlling temperature is located directly with the primary container 1, the metal plate 5b can be located in an appropriate position on the exterior wall surface of the container 1 so as to cool the liquid 60 in the container 1 as shown in FIG. 9. In this example, it is preferable to adjust the position of the metal plate 5b so that there is stronger cooling effect at a position below the level of the boundary between the gas 70 and the liquid 60. This prevents occurrence of freezing about the boundary. Further, as shown in FIG. 10, the means 5 for controlling temperature can be presented in a form comprising a coil-shaped portion 5c in the liquid 60 in the container 1. Further alternatively, as shown in FIG. 11, the means 5 can be presented in a form comprising a coil-shaped portion 5c which is coiled around the exterior surface of the container 1, wherein a cooling medium flows through the coil-shaped portion 5c to cool the liquid 60 in the container 1.

Figure 12:
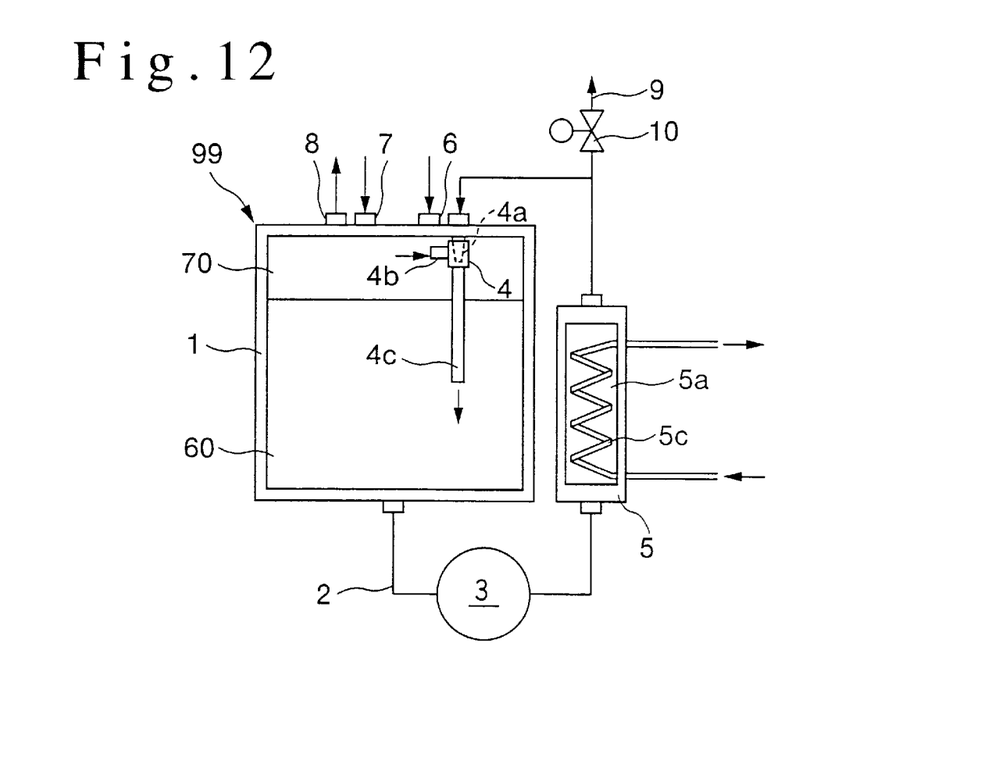
FIG. 12 is a schematic elevation partly in section of a further modified type of embodiment from the apparatus of FIG. 1 so that the circulating line is provided with the means for controlling temperature wherein the means for controlling temperature has a coil-shaped portion through which some cooling medium flows.
Figure 13:
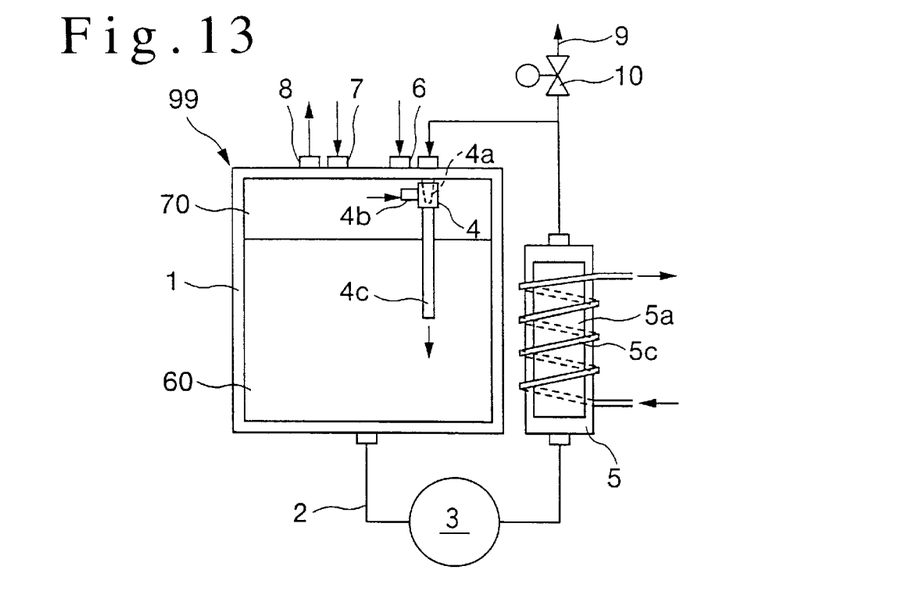
FIG. 13 is a schematic elevation partly in section of a modified embodiment of the apparatus of FIG. 12.
Figure 14:
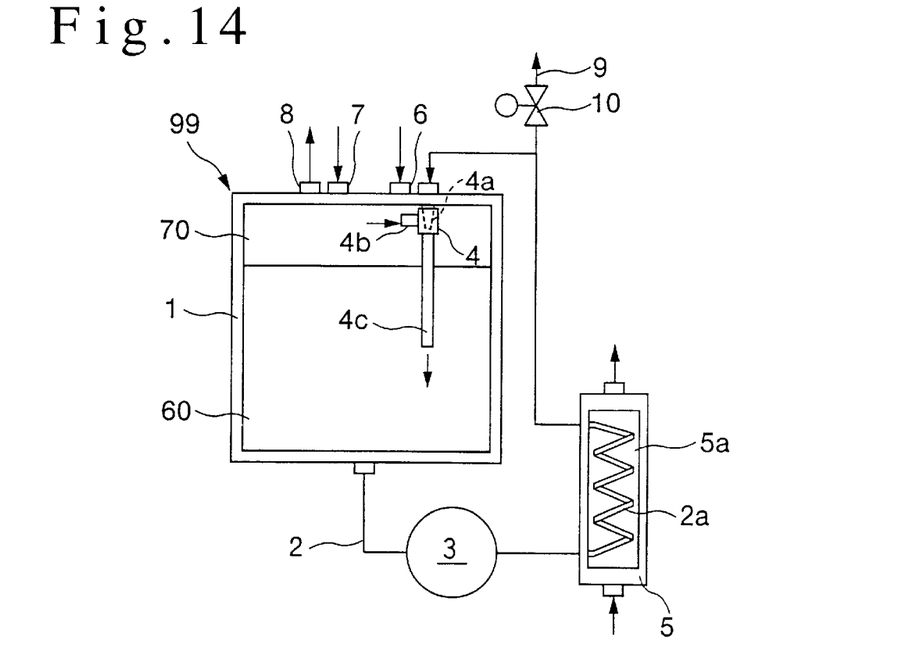
FIG. 14 is a schematic elevation partly in section of a further modified type of embodiment from the apparatus of FIG. 1 so that a portion of the circulating line is configured in a coil-shaped manner and is located in the means for controlling temperature.

On the other hand, as a type wherein the means 5 for controlling temperature is directly located at the circulation line 2, the coil-shaped portion 5c can be located in the cooling chamber 5a as shown in FIG. 12, or can be coiled around the cooling chamber 5a as shown in FIG. 13. In these forms, the cooling medium flows through the coil-shaped portion 5c to cool the liquid 60 in the cooling chamber 5a. In a further modified form, for example, a portion 2a of the circulation line 2 is configured in a coil-shaped manner located in the cooling chamber 5a, wherein the liquid 60 flows through the coiled portion 2a and the cooling medium flows through the cooling chamber 5a so as to cool the liquid 60 in the coiled portion 2a. In view of all these details and modifications, many changes or variations as needed would be possible within and in accordance with the spirit of the present invention.

In the ozone water producing apparatus 99 as shown in the above embodiment, when the required amount of the liquid 60 and the required amount of the gas 70 are introduced into the container 1, they contact each other so as to mix and dissolve ozone into the liquid 60 at the boundary layer. Further, when the pump 3 is operated, the liquid 60 is circulated through the circulation line 2 and is then jetted from the nozzle 4a of the aspirator 4, being in the form of very fine droplets and causing negative pressure at the outlet of the nozzle. Therefore, the gas 70 in the container 1 is sucked in via the suction orifice 4b and ozone is mixed and dissolved into the liquid 60. Further, the liquid 60 containing thus mixed-and-dissolved ozone is returned from the return 4c and spurted into the bulk liquid 60 in the container 1, thereby stirring the liquid 60. This stirring also accelerates the mixing and dissolving of ozone into the liquid 60. The mixing and dissolving operation can be repeatedly continued because the ozone water circulates via the circulation line 2, thereby enabling the apparatus to produce high concentration ozone water quickly. If the temperature of the circulating ozone water is kept in the range of 4–6 degrees Celsius by the means 5 for controlling temperature, the equilibrium of the concentration of ozone in the water and the dissolving of ozone into the water is so accelerated that even about 65 ppm+−5 ppm ozone water can be produced at 5 degrees +−0.5 degrees Celsius, under the provision of 10% ozone gas at the flow rate of 0.4 gram/hour. By changing set value of the temperature, the concentration value can be controlled.

The essence of the above apparatuses for producing ozone water can be extensively adopted as a principle for apparatuses used for rapid mixing and dissolving of a gas which is hardly soluble into a liquid. In this point of view, we can see at least the (1)–(3) advantages as follows:

(1) Together with the constant contact of the gas and the liquid housed in a container, there can be obtained repeatedly and simultaneously an accelerating effect from the mixing-dissolving of the gas sucked into the liquid in the circulation line and an accelerating effect from the stirring caused by the resulting spurting of thus mixed gas and liquid into the aforementioned liquid housed in the container. Therefore, mixing and dissolving of the gas into the liquid is achieved in high efficiency, and there enabled rapid production of solution of mixed gas and liquid, flexible control of concentration and maintenance of the solution of mixed gas and liquid, allowing outputs on as-needed basis.

(2) The liquid circulation line can be located independently of the intake of the gas, the intake of the liquid and outlets of the product. This means a reduction of unwanted changes of pressure at the gas generator. Further, the overall structure becomes simplified and the number of parts can be reduced.

(3) The essence of the invention in principle allows integral formation of most portions which contact the gas, the liquid or the mixture, which leads to reduced risk of leakage of them and to a compact arrangement.

Figure 16:
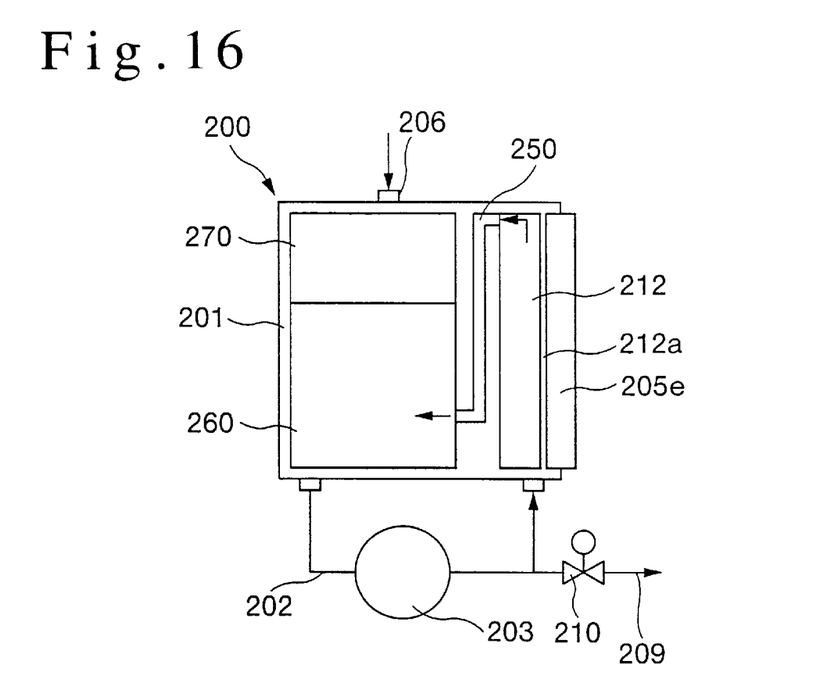
FIG. 16 is a schematic elevation partly in section of a modified embodiment of the apparatus of FIG. 15.
Figure 17:
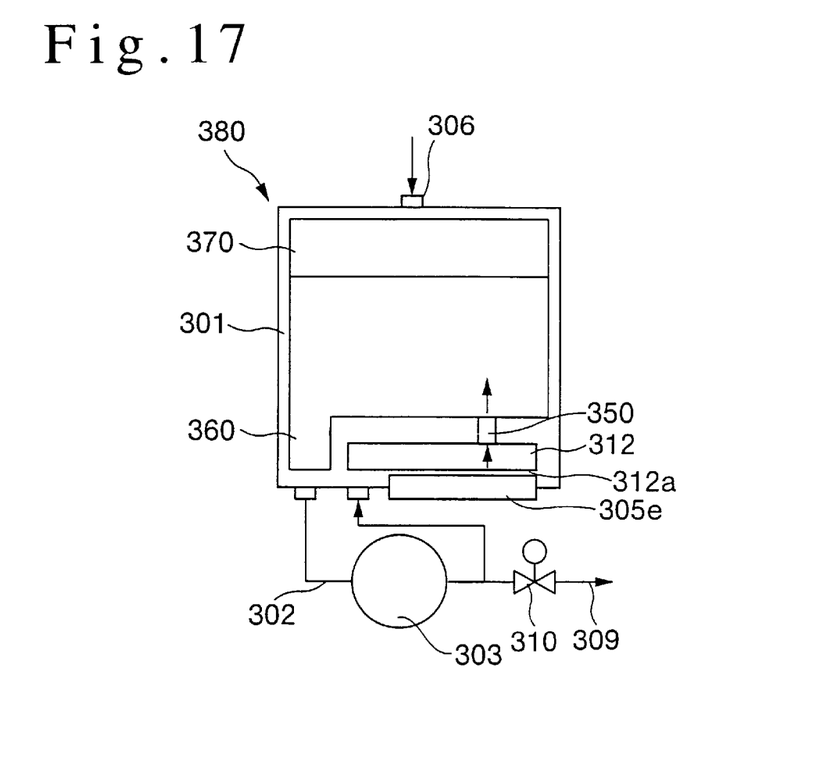
FIG. 17 is a schematic elevation partly in section of another modified embodiment of the apparatus of FIG. 15.

On the other hand, the apparatus 99 of the present invention can be used as an reservoir of ozone water, if the liquid 60 is prepared as ozone water before it is introduced into the apparatus 99. In fact, as illustrated in FIGS. 15–7, an apparatus as an ozone water reservoir can be presented without including the whole components of the apparatus 99 but based on some novel features of the apparatus 99.

Figure 15:
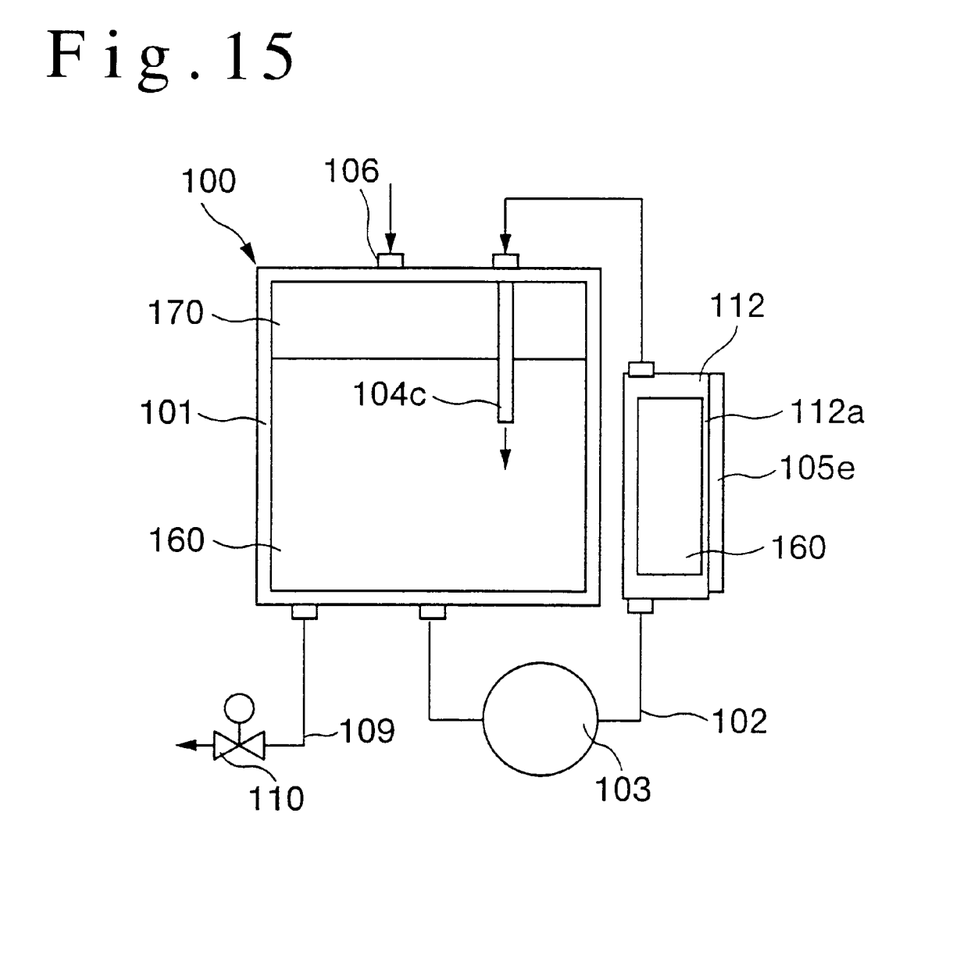
FIG. 15 is a schematic elevation partly in section of an ozone water reservoir in accordance with the present invention.

In FIG. 15, an ozone water reservoir 100 comprises a primary container 101 to contain ozone water 160, a secondary container 112 which is in a thin shape to have the ozone water 160 flow through it, a circulation line 102 which connects these containers, a circulation pump provided in the circulation line 102 and a means 105e for controlling temperature attached to the secondary container 112.

The figure shows the container 101 in the form containing the gas 170, however, the container 101 can be adapted to be operable in a state almost wholly filled with the liquid 160. The primary container 101 is formed in such a manner to comprise a material such as anticorrosive ozone-proof resin at its inner surface. The primary container 101 and the secondary container 112 is connected by a circulation line 102. Further, at the upper portion of the container 101 provided is a conduit 104c for spurting the returning ozone water 160 into the ozone water 160 in the container 101. At the upper portion also provided is an inlet opening 106 for introducing the ozone water 160 into the container 101. At the lower portion of the container 101 provided is an outlet 109 for letting out the ozone water 160 from the container 101. The outlet 109 is further provided with an open/close valve 110.

The secondary container 112 is provided so as to have the ozone water 160 flow therethrough and in order to control temperature of the ozone water. It is configured in a thin shape so that deviations of the controlled temperature are reduced. It is preferred that a portion at which the means 105e for controlling temperature is attached is especially configured to comprise a thin wall 112a with a membrane of anticorrosive resin or other anticorrosive non-metal substance. Also, the interior surface of the secondary container 112 of course should be configured to have proper anticorrosive characteristic against ozone.

The means 105e is provided in order to control temperature of the ozone water 160 which flows through the secondary container 112 by heat exchange. It comprises a metal plate which excels in heat conductivity. The face (rather than the edge or angle) of the metal plate is contacted with the wall 112a. The temperature of the ozone water 160 is controlled by cooling or heating the metal plate. For the purpose of this cooling or heating, utilization of Peltier elements is advantageous because it is free of undesirable vibrations, etc. However, means to cool or heat the metal plate is not necessarily limited to the Peltier effect elements. In other words, other temperature control elements, air cooling, liquid cooling, or other general technologies can be adopted.

FIG. 16 shows an embodiment of a reservoir 200 which comprises an integral main body including a primary container 201 and a secondary container 212 aligned laterally. Between these containers, the reservoir 200 is provided with a conduit 250 as a part of a circulation line 202. The conduit 250 has an upper end connected to the secondary container 212 and a lower end opened towards the ozone water 260 in the primary container 201. Therefore, this type of reservoir 200 can be made in as compact a style as possible by forming its integral body commonly using an anticorrosive resin for the primary container 201, the secondary container 212 and the conduit 250. At the same time, this type excels in reducing the number of parts and the number of connection points to minimum.

FIG. 17 shows an embodiment of a reservoir 300 which comprises an integral main body including a primary container 301 and a secondary container 312 aligned vertically in the body. At as far a position as possible from the connection point of the circulation line 302 into the container 301, the apparatus 300 is provided with a conduit 350 as a part of the circulating line 302. The conduit 350 has a lower end connected to the secondary container 312 and an upper end opened into the ozone water 360 in the primary container 301. Therefore, this type of reservoir 300 can be made in as compact a style as possible by integral formation commonly using an anticorrosive resin for the primary container 301, the secondary container 312 and the conduit 350. At the same time, this type also excels in reducing the number of parts and the number of connection points to minimum.

In the above illustrated reservoirs (100, 200, 300), in order to control temperature of the ozone water (160, 260, 360) in the primary containers (101, 201, 301), the pumps (103, 203, 303) located in the circulation lines (102, 202, 302) are operated with the temperature control means (105e, 205e, 305e) being set for a preferred temperature. Thus, the ozone water is sent from the primary container into the secondary container and then is returned from the secondary container into the primary container.

The ozone water being recirculated in this way is cooled due to heat exchange with the temperature control means when it flows through the thin shaped secondary container. Then, via a conduit, the recirculating portion of the ozone water is spurted into the rest of the ozone water in the primary container and is stirred and mixed with each other in the primary container. These operations can be performed repeatedly. Therefore, the ozone water is rapidly cooled and is set into a state having a preferred temperature with reduced deviations. Such state can be further maintained.

In need for controlling the temperature of the ozone water so as to make it higher than the circumstantial temperature, it should be understood that if the means for controlling temperature is set for high temperature and if the recirculating and the spurting into the ozone water in the primary container are repeated, a rapid control to raise the temperature of the ozone water is achieved.

As described above, the ozone water reservoir of the present invention has an ability to control temperature, wherein some of its distinctive points as compared with conventional apparatuses for controlling temperature of a liquid is explained in the following.

A typical conventional apparatus for controlling temperature of a liquid achieves temperature control by externally providing a means for controlling temperature onto a heat-conductive metal container, or by internally providing a means for controlling temperature in the liquid in a container. However, the external means type apparatus risks a freezing phenomenon on the wall portion contacting the boundary surface of the gas and the liquid which co-exist in the container when cooled. The internal means type comprises a metal pipe as a part of a means for controlling temperature jointed with an anticorrosive resinous container. It risks leakage of the liquid due to the defectiveness of the joint. These risks of the freezing and the leakage are fatal problems in the apparatuses to control temperature of liquid which accompanies gas phase. However, it is quite difficult to sense an occurrence of freezing in the container. In addition, because neither the conventional external type configuration nor the conventional internal type configuration result in a cause of compulsive stirring of the liquid, such apparatuses are not free of temperature deviations due to insufficient stirring. In order to overcome these defects when using those using those conventional apparatuses, it has been necessary to make modifications to the apparatuses, which leads to vast increase in number of component parts and production steps. Especially, to meet the difficult requirements for controlling temperature of the corrosive ozone water, applicable metal materials further having appropriate workability and strength could not have been selected but for very expensive ones.

On the other hand, the reservoir according to the present invention has the following advantages:

(4) The number of component parts and the number of joints can be reduced to minimum.

(5) The primary container, the secondary container, the conduits, etc. can be integrally formed using an anticorrosive resin.

(6) Temperature control of ozone water is performed in high efficiency and in a state having reduced problems of leakage, freezing and temperature deviations.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An apparatus for producing ozone water by dissolving gas including ozone into liquid mainly comprising water, characterized in that said apparatus comprises a circulation line and a primary container for containing in-process ozone water, wherein said circulation line is provided with a thin-shaped secondary container which is separate from said primary container, wherein said secondary container is provided with a means for controlling temperature so as to accelerate dissolving of said ozone into said liquid and is provided with an inner surface comprising an anti-ozone-corrosive thin membraned wall.

2. An apparatus for producing ozone water as set forth in claim 1, wherein said circulation line is adapted to circulate said liquid and to jet said liquid from a position communicated with said gas and comprises a means for sucking and mixing said gas into said liquid to be jetted, wherein said means further comprises a nozzle which is located in said circulation line so as to jet said liquid, thereby locally causing negative pressure about an outlet thereof.

3. An ozone water reservoir comprising a primary container for holding ozone water and a circulation line to circulate and return said ozone water into said primary container thereby stirring said ozone water, wherein said circulation line comprises a thin-shaped secondary container which is provided with a means for controlling temperature, wherein said secondary container comprises an anti-ozone-corrosive thin membraned wall and wherein said means for controlling temperature comprises a cooling medium made of metal which contacts with said membraned wall.

4. An ozone water reservoir as set forth in claim 3, wherein said means for controlling temperature utilizes a Peltier element so as to cool said cooling medium.

5. An ozone water reservoir as set forth in claim 3, wherein said means for controlling temperature comprises a coil-shaped portion through which some cooling medium flows.

6. An apparatus for producing ozone water by dissolving gas including ozone into liquid mainly comprising water, said apparatus comprising:

a primary container for containing the gas and the liquid in a state wherein the gas and the liquid contact each other;

a circulation line which is provided with means for controlling temperature and which is adapted to circulate the liquid and to jet the liquid from a position communicated with the gas;

means for sucking and mixing the gas into the liquid being jetted, said means for sucking and mixing comprising a nozzle which is provided in said circulation line and jets the liquid, thereby causing negative pressure about an outlet of said nozzle; and said circulation line comprising a thin-shaped secondary container which is separate from said primary container, said secondary container having an inner surface comprising an anti-ozone-corrosive thin membrane wall, and said means for controlling temperature being located at said secondary container.

* * * * *